United States Patent
Sayal et al.

(10) Patent No.: US 7,912,938 B2
(45) Date of Patent: Mar. 22, 2011

(54) CORRELATION OF WEB SERVICE INTERACTIONS IN COMPOSITE WEB SERVICES

(75) Inventors: Mehmet Sayal, Santa Clara, CA (US); Akhil Sahai, Santa Clara, CA (US); Vijay Machiraju, Mountain View, CA (US); Aad van Moorsel, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2417 days.

(21) Appl. No.: 10/412,497

(22) Filed: Apr. 11, 2003

(65) Prior Publication Data

US 2004/0205187 A1  Oct. 14, 2004

(51) Int. Cl.
*G06F 15/173* (2006.01)
(52) U.S. Cl. ...................................................... 709/224
(58) Field of Classification Search .................. 709/203, 709/205, 206, 212, 229, 248, 224
See application file for complete search history.

(56) References Cited

U.S. PATENT DOCUMENTS

| | | | |
|---|---|---|---|
| 7,047,243 B2 * | 5/2006 | Cabrera et al. | 707/10 |
| 7,107,314 B2 * | 9/2006 | Cox | 709/205 |
| 7,305,431 B2 * | 12/2007 | Karnik et al. | 709/203 |
| 7,340,508 B1 * | 3/2008 | Kasi et al. | 709/219 |
| 2003/0046409 A1 * | 3/2003 | Graham | 709/229 |
| 2003/0110485 A1 * | 6/2003 | Lu et al. | 725/9 |
| 2003/0133554 A1 * | 7/2003 | Nykanen et al. | 379/201.01 |
| 2003/0195961 A1 * | 10/2003 | Breese et al. | 709/226 |
| 2004/0059810 A1 * | 3/2004 | Chess et al. | 709/224 |
| 2004/0103195 A1 * | 5/2004 | Chalasani et al. | 709/226 |
| 2004/0117311 A1 * | 6/2004 | Agarwal et al. | 705/52 |
| 2004/0133656 A1 * | 7/2004 | Butterworth et al. | 709/219 |
| 2004/0243685 A1 * | 12/2004 | Sabiers et al. | 709/212 |
| 2005/0080930 A1 * | 4/2005 | Joseph | 709/248 |

OTHER PUBLICATIONS

Sahai et al., "Automated SLA Monitoring for Web Services", HP Laboratories, pp. 1-26.*

* cited by examiner

*Primary Examiner* — Ario Etienne
*Assistant Examiner* — Hee Soo Kim

(57) ABSTRACT

Method and apparatus for tracing operations of and interactions between components of a composite web service. An identifier code is generated at the initiation of a web service, and the identifier code is propagated in messages transmitted between components of the web service. The identifier code and message-description data are logged in a correlation database when a component receives a message and when a component sends a message.

25 Claims, 5 Drawing Sheets

CORRELATION OF WEB SERVICE INTERACTIONS IN COMPOSITE WEB SERVICES

FIELD OF THE INVENTION

The present disclosure generally relates to correlating interactions between web service components in composite web services.

BACKGROUND

An important technology growing out of Internet usage has been the use of Web services. Web services are network-based (particularly Internet-based) applications that perform a specific task and may typically conform to a specific technical format. Web services are represented by a number of emerging standards that describe a service-oriented, component-based application architecture, collectively providing a distributed computing paradigm having a particular focus on delivering services across the Internet.

Generally, Web services are implemented as self-contained modular applications that can be published in a ready-to-use format, located, and invoked across the World Wide Web. When a Web service is deployed, other applications and Web services may locate and invoke the deployed service. They may perform a variety of functions, ranging from simple requests to complicated business processes.

Traditionally, Web pages were static files that were downloaded to a user's browser, and the browser interpreted the page for display, as well as handling user input to objects such as forms or buttons. Web services extend the Web's capability to include dynamic content and user interaction. Web services are typically configured to use standard Web protocols such as Hypertext Transfer Protocol (HTTP), Hypertext Markup Language (HTML), Extensible Markup Language (XML) and Simplified Object Access Protocol (SOAP). HTTP, HTML, and XML are typically used to handle user input and output of Web pages and other user data. SOAP is typically used for request and reply messages between Web services.

The use of Web services has made the browser a much more powerful tool. Far from being simple static Web pages, Web services now can handle tasks as complex as any computer program, yet can be accessed and run anywhere due to the ubiquity of browsers and the Internet.

The complex behaviors provided by Web services require more than standard HTML layout skills to implement. The task of writing and debugging Web services falls to computer programmers. Programmers have the ability to design Web service objects, since Web services objects use instructions like traditional programming languages. However, unlike traditional computer programs, Web services are designed primarily for easy interaction with other Web services.

Although traditional programs can be designed to interact with other programs, such interaction is usually limited. Most computer programs can handle simple interactions such as cut and paste, but full interaction such as remote method invocation between disparate programs is the exception rather than the rule.

In contrast, Web services are designed for interaction. This interactivity has been enhanced by the fact they are built upon standard, open, widely adopted, and well understood protocols. It easier than ever to deploy independently developed Web services that interact naturally. However, this high level of interaction makes debugging Web services more difficult. When developing a unified application, standard tools such as debuggers can be used to track program execution. However, Web services may involve multiple programs interacting on various computers anywhere in the world. These interactions may be hard to predict and track during run-time, especially since some public Web services may not be accessible by developers at a troubleshooting level.

SUMMARY OF THE INVENTION

The various embodiments of the invention support tracing operations of and interactions between components of a composite web service. An identifier code is generated at the initiation of a web service, and the identifier code is propagated in messages transmitted between components of the web service. The identifier code and message-description data are logged in a correlation database when a component receives a message and when a component sends a message.

BRIEF DESCRIPTION OF THE DRAWINGS

Various aspects and advantages of the invention will become apparent upon review of the following detailed description and upon reference to the drawings in which.

DETAILED DESCRIPTION

Figure 1:
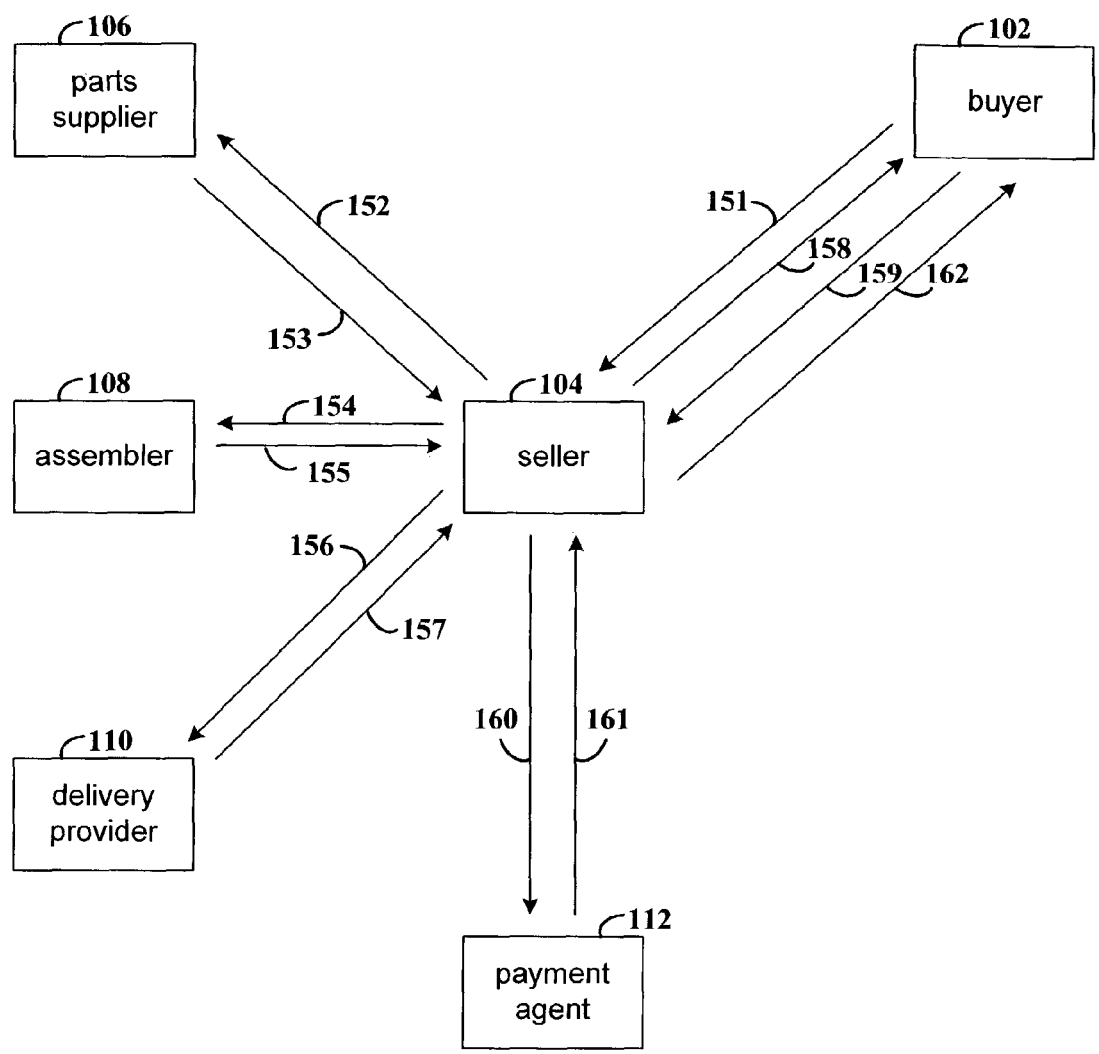
FIG. 1 is a block diagram that illustrates example interactions between example Web service components in a composite web service involving the purchase of a product.

Web services are accessed via ubiquitous Web protocols and data formats, such as Hypertext Transfer Protocol (HTTP) and Extensible Markup Language (XML). Thus, at present, an example basic Web service platform is XML plus HTTP. XML is a text-based markup language that is currently used extensively for data interchange on the Web.

As with HTML, XML data is identified using tags, which are collectively known as "markup." XML tags identify the data, and act as a field name in the program. XML is a language that supports expression of complex interactions between clients and services, as well as between components of a composite service. HTTP is an application protocol, and more particularly is a set of rules for exchanging files (text, graphic images, sound, video, and other multimedia files) on a network such as the World Wide Web.

Web services represent a collection of several related technologies, and involve connections between at least two applications, such as a remote procedure call (RPC), in which queries and responses are exchanged in XML over HTTP. Web service technologies may be defined in terms of various technology layers. The core layers include a transport layer, such as TCP/IP or HTTP as previously described, in which XML messages may be communicated.

An XML messaging layer can be used for invoking RPCs across the Web. Two such protocols, Simple Object Access Protocol (SOAP) and XML-RPC, represent a core layer of Web services that provide this functionality. SOAP and XML-RPC are protocol specifications that define a uniform manner of passing XML-encoded data, as well as defining a manner to perform RPC using HTTP as the underlying communication protocol. XML-RPC is generally associated with HTTP for transport, although SOAP can use other underlying protocols, such as Simple Mail Transfer Protocol (SMTP) to invoke RPCs.

Although Web service objects generally communicate using a standard protocol such as SOAP or XML-RPC, the objects themselves can be created using any programming technology known in the art. Web service objects can be compiled binaries (e.g C/C++, Ada, Pascal), scripts (e.g. Perl, Python) or interpreted objects (e.g. Java™, Visual Basic®). Two popular forms of Web objects are JavaServer Pages™ (JSP) and Enterprise Java Beans™ (EJB).

A composite Web service is composed of multiple Web services. For purposes of further discussion herein, a composite Web service is referred to as a Web service, and the constituent Web services of the composite Web service are referred to as Web service components. The composite Web service entails the overall work that is to be performed by the collection of Web service components. For example, a composite Web service may support the purchase of a piece of equipment, and the Web service components might entail the submission of a purchase order, parts management, assembly management, delivery management, and payment management.

Each of the Web service components will be aware of the direct interactions it has with other Web service components. However, a Web service component is unlikely to be aware of interactions between other components that make up the composite Web service. The various embodiments of the invention support automatic correlation of interactions between the Web service components in a composite Web service. In addition, work done by processes at the request of a component, for example, database management systems or workflow management systems, are correlated with the composite Web service.

By automatically correlating the interactions between the various Web service components for a composite Web service, along with the work performed by the processes associated with the components, if a composite web service fails to produce an expected outcome the source of a problem may be easily isolated. Service Level Agreements (SLAs) between the Web service components set forth the requirements to which each component is expected to adhere when interacting with other components, for example, specifying what is to be done and when the action is to be done. If a composite Web service fails to produce the desired outcome, logged and correlated interactions between the components may be analyzed relative to the SLAs, and a failure to meet the requirements of an SLA may point to the source of a problem.

Web service composition may be accomplished using a variety of approaches. In a composition specification, composition definitions define how Web services are composed together. Workflow process definitions may be set forth to coordinate the execution of activities in the composite service definition. A composite Web service may be defined using a Web service conversation language (WSCL), and a global flow definition may be used to describe the flow of activities among the Web service components that participate in the composition. An example composite Web service is presented to illustrate an example application in which Web service interactions are correlated.

FIG. 1 is a block diagram that illustrates example interactions between example Web service components in a composite Web service involving the purchase of a product. The Web service components include the buyer 102, seller 104, part supplier 106, assembler 108, delivery provider 110, and payment agent 112. The buyer Web service component provides the interface for initiating the purchase of the product, for example via a purchase order (line 151).

The seller Web service component 104 coordinates various aspects of providing the product to the buyer. A purchase order for parts is directed (line 152) to a parts supplier Web service component (106) to procure the parts needed to manufacture the product. Depending on the availability of the parts, as communicated from the parts supplier 106 to the seller 104 (line 153), the seller may perform additional internal activities in support of delivering the product.

If and when parts are available, the seller 104 schedules assembly of the product with the assembler Web service component 108 (line 154). When the product is complete and available to the seller (line 155), the seller schedules delivery of the product to the buyer with the delivery provider Web service component 110 (line 156). When the product is delivered the delivery provider 110 informs the seller (line 157), and the seller then sends an invoice to the buyer (line 158). The buyer sends payment information to the seller (line 159), and the seller uses the payment agent Web service component 112 to receive payment (line 160). The payment agent communicates to the seller when payment has been made (line 161), and the seller sends a final message to the buyer to indicate that the transaction is complete (line 162).

As indicated above, an SLA is a contract between two web service components which defines the terms that must be satisfied by each of the components when interacting.

TABLE 1

| Server | Client | SLA statement |
| --- | --- | --- |
| Seller | Buyer | Seller will send the bill within 8 hours, 5 minutes after receiving a purchase order (PO) from buyer |
| Parts supplier | Seller | Parts supplier will send the ordered parts within 3 hours after receiving a purchase order (PO) |
| Assembler | Seller | Assembler will deliver the assembled product within 3 hours after assembly is scheduled |
| Delivery provider | Seller | Delivery provider will deliver the product within 2 hours after delivery is scheduled |

The various embodiments of the invention correlate the interactions between the various Web service components relative to the work of a composite Web service. For example, the interactions between the buyer, seller, parts supplier, assembler, delivery provider, and payment agent components are correlated for each purchase order submitted by the buyer component. The interactions resulting from separate purchase orders are separately correlated. That is, the interactions related to one purchase order do not correlate with the interactions related to another purchase order. In the example embodiments, the interactions are correlated by way of correlation databases that are associated with the various Web service components.

The correlation databases store data that describe message exchanges between the Web service components and data that describe the actions taken by the Web service components in support of the composite Web service. For example, Table 2 shows message exchange data in the correlation database associated with the seller 104, and Table 3 shows message exchange data in the correlation database associated with the parts supplier 106. Table 4 shows data that describe actions taken by the parts supplier in support of the composite Web service.

TABLE 2

| Correlator Code | Send Time | Receive Time | Type | Msg. ID | Parent ID | Sender | Receiver |
|---|---|---|---|---|---|---|---|
| 0001 | | 07:00:01 am | PCPO | 001 | | Buyer | Seller |
| 0001 | 07:00:20 am | | PartsPO | 002 | 001 | Seller | Parts Supplier |
| 0001 | | 10:15:01 am | Parts Confirm | 003 | 002 | Seller | Seller |
| ... | ... | ... | ... | ... | ... | ... | ... |

The Correlator Code is used to relate the message exchange data for a particular Web service request. The Send Time is the time at which a message was sent, and the Receive Time is the time at which a message is received. The Type indicates the type of message, and the Msg. ID uniquely identifies the message. The Parent ID is applicable to a sent message and indicates the Msg. ID of the received message to which the sent message is in response. The Sender indicates the Web service component that is the sender of a message, and the Receiver indicates the web service component that is the receiver of a message.

TABLE 3

| Correlator Code | Send Time | Receive Time | Type | Msg. ID | Parent ID | Sender | Receiver |
|---|---|---|---|---|---|---|---|
| 0001 | | 07:00:22 am | PartsPO | 002 | 001 | Seller | Parts Supplier |
| 0001 | 10:15:20 am | | Parts Confirm | 003 | 002 | Parts Supplier | Seller |
| ... | ... | ... | ... | ... | ... | ... | ... |

TABLE 4

| Correlator Code | Start Time | End Time | Activity Name | Process ID |
|---|---|---|---|---|
| 0001 | 07:01:30am | 07:35:00am | Check Inventory | p00123 |
| 0001 | 07:35:20am | 9:59:22am | Collect Parts | p00123 |
| 0001 | 09:59:45am | 10:14:30am | Deliver Parts | p00123 |
| 0001 | 10:14:30am | 10:15:01am | Send Delivery Notification | p00123 |
| ... | ... | ... | ... | ... |

The Start Time indicates the time at which the supporting activity starts, and the End Time indicates the time at which the supporting activity ends. The Activity Name is the program performing work in support of a web service component, and the Process ID is the operating-system-provided identifier.

The correlation databases allow problems to be traced back to the source. For example, if the buyer does not receive the ordered products within the expected time, the correlation databases may be queried to help determine the source of the problem. The starting point for analysis is to first obtain the correlator code of the composite Web service transaction in question. This may ordinarily be obtained at the Web service component that has experienced a problem. The correlation databases are then queried for all message exchange data related to the correlation code. The message exchange data are analyzed in view of the SLAs of the composite Web service.

In the present example of Tables 1-4, analysis of the second and third records (rows) in Table 2 shows that the parts supplier 106 violated its SLA with the seller 104. That is, the SLA between the parts supplier and the seller requires that the parts supplier send the ordered parts within 3 hours after receiving the PO. The second and third records of the parts supplier correlation database show that the seller sent a parts PO at 07:00:20 a.m. and did not received a confirmation message until 10:15:01 a.m., which is approximately 15 minutes late under the terms of the SLA. The records of Table 3 further implicate the parts supplier in the problem.

Table 4 shows example execution records that correspond to workflow activity at the enterprise where the parts supplier web service component is located. This data may be used to help determine the source of the problem at the parts supplier. For example, it may be that the collection of parts from various inventories took longer than what is normally expected. Further analysis of these correlated records may help in developing mechanisms for predicting future SLA violations and taking precautions before the violations occur.

Figure 2:
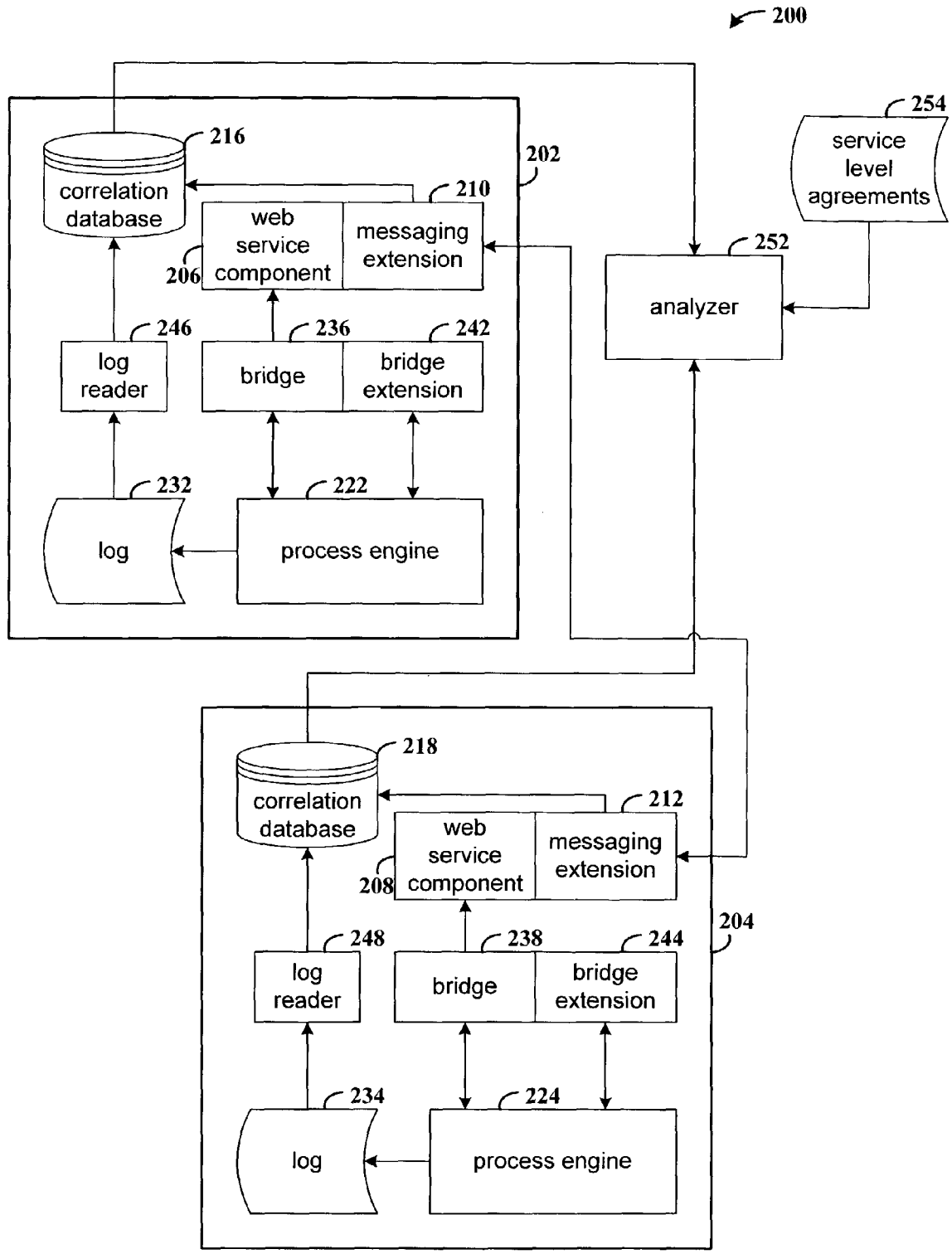
FIG. 2 is a functional block diagram of a computing arrangement for correlating interactions between Web service components in accordance with various embodiments of the invention.

FIG. 2 is a functional block diagram of a computing arrangement 200 (including one or more computers) for correlating actions between Web service components in accordance with various embodiments of the invention. Blocks 202 and 204 represent different enterprises that are responsible for supporting associated Web service components 206 and 208, respectively. The enterprises may be different businesses, different divisions within a company, or different governmental entities, for example. The Web service components of FIG. 1 are examples of Web service components 206 and 208. Those skilled in the art will appreciate that even though reference is made to specific protocols, toolkits, and process engines in the description of FIG. 2, various alternatives and combinations could be used to achieve application-specific objectives.

The Web service components communicate via respective messaging extensions 210 and 212. In addition to providing communication between the components, the messaging extensions write to an associated correlation database records that describe the messages that are sent and received. Messaging extension 210 writes to database 216, and messaging extension 212 writes to database 218. In an example embodiment, a messaging extension may be implemented by extending selected SOAP Toolkit classes. In particular, the Message Router and Message classes may be extended. The Message Router is responsible for receiving SOAP messages in the original SOAP Toolkit and is extended to capture incoming messages. The Message class implements the generation of outgoing SOAP messages in the original SOAP Toolkit and is extended to capture outgoing messages.

Each correlation database stores data that describe message interactions and data that describe back-end functions of the Web service component. In the example embodiment (and as illustrated in the example described in association with FIG. 1, each record contains the following information. For message interactions, the records contain a correlator code, the time at which the message was sent or received, an indicator of the type of the message, a message identifier that uniquely identifies the instance of the message, an identifier of the parent message (the incoming message that triggered the submission of the message described in the record, the identifier of the sender host system, and the identifier of the receiver host system. For process engine activities, a record contains a correlator code, the time at which the activity started or completed, the name of the activity, and the process identifier of the activity. Each record may contain a subset of the fields because some data may be unavailable depending on host system configuration.

Process engines 222 and 224 manage the back-end implementation for the associated Web service components 206 and 208, respectively. Additional application software (not shown) provides the back-end implementation. An example process engine is a Workflow Management System (WfMS), such as the Hewlett-Packard Process Manager (HPPM). A Web service component invokes processes of the WfMS in order to manage execution of activities that are necessary for satisfying requests. The activities may in turn invoke other local activities or invoke other Web service components. Each process engine 224 and 224 logs to an associated log file 232 and 234 data that describe actions taken by activities managed by the process engine.

Bridge 236 provides an interface between Web service component 206 and process engine 222, and bridge 238 provides an interface between Web service component 208 and process engine 224. A bridge performs three major functions. The first function relates to the Web service component receiving a request message that requires the initiation of an internal process of the process engine. The Web service passes this information to the bridge, and the bridge contacts the process engine for initiation of the proper process and passes the required input parameters to the new process instance.

The second function relates to an active process managed by the process needing to send a message outside the enterprise. The process engine informs the bridge, and the bridge retrieves the necessary parameters form the process instance variables and passes the message submission request to the Web service component. The Web service component transmits the message to a Web service component at a different enterprise.

The third function relates to a Web service component receiving a message that needs to be forwarded to an instance of a process managed by the process engine. The Web service component passes this message to the bridge, which in turn passes the message to the appropriate process engine.

The bridge extensions 242 and 244 are used to pass correlator codes from Web service components 206 and 208 to the process engines 222 and 224. In an example embodiment, process engines 222 and 224 are implemented using the HPPM, and because HPPM does not include provisions for bridge functions, both the bridges and bridge extensions are implemented from scratch, as opposed to using a commercial toolkit.

The log readers 246 and 248 are provided to update the local correlation databases 216 and 218 with information logged by the local process engines 222 and 224. Each local process engine logs data that describes actions taken by activities managed by the process engine. In an example embodiment, each log reader periodically reads data from a log, and writes the data to the correlation database.

An analyzer 252 may be provided to help identify sources of problems arising in processing requests for a composite Web service. The analyzer may be a tool hosted on a computing arrangement that has access to the correlation databases 216 and 218 of the enterprises 202 and 204 that host the Web service components of the composite Web service. The analyzer reads from the correlation databases data that are related to a selected correlator code. The data are then analyzed relative to service level agreements 254.

Figure 3:
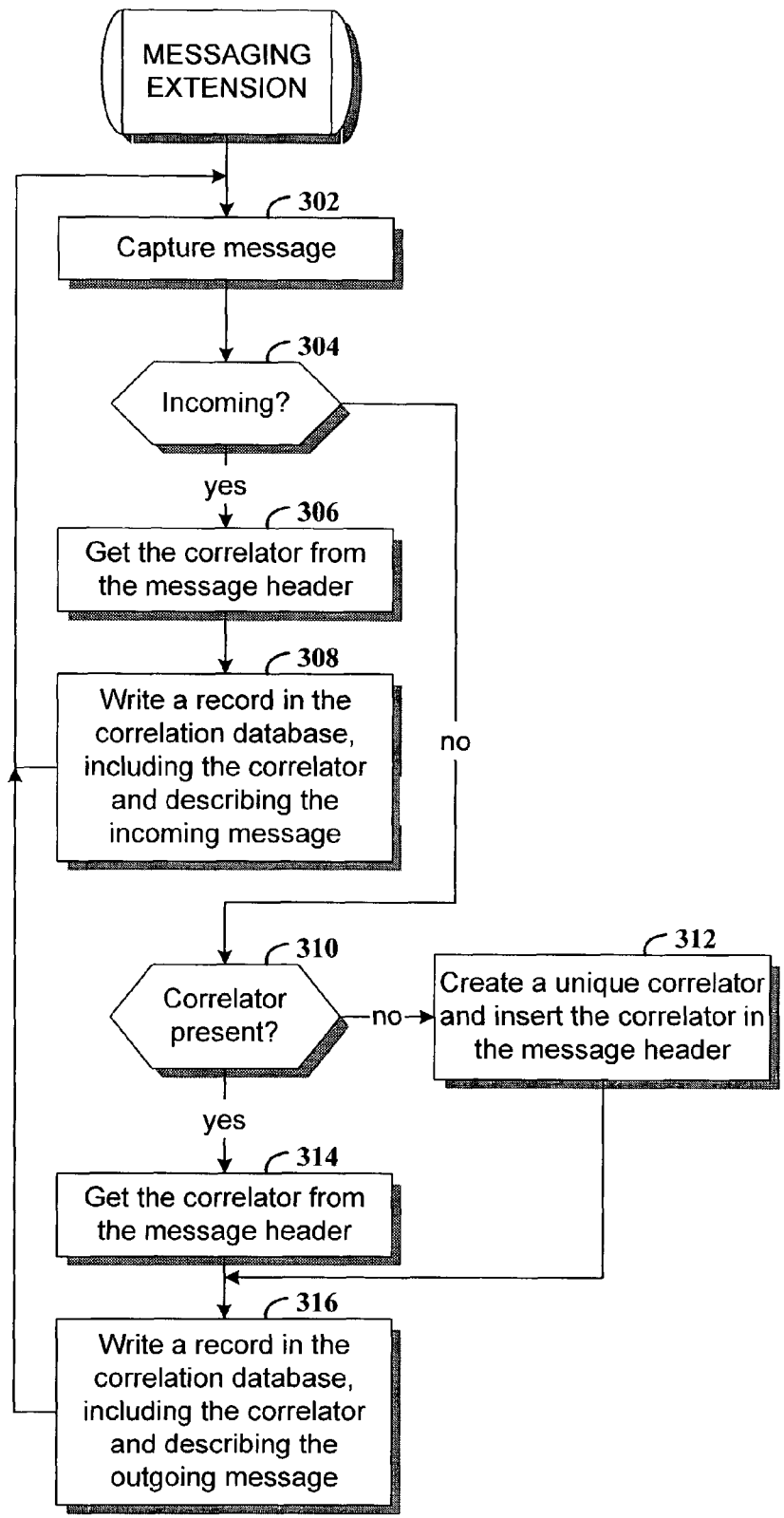
FIG. 3 is a flowchart of an example process implemented by a messaging extension.

FIG. 3 is a flowchart of an example process that implements a messaging extension in accordance with various embodiments of the invention. The messaging extension generally captures incoming and outgoing messages to and from a Web service component (step 302). If the message is an incoming message (decision step 304), the correlator code is obtained from the message header (step 306). It will be appreciated that the message format and any encoding are implementation dependent. Along with the correlator code, a record is written to the correlation database that includes the time at which the message was sent or received, an indicator of the type of the message, a message identifier that uniquely identifies the instance of the message, an identifier of the parent message (the incoming message that triggered the submission of the message described in the record, the identifier of the sender host system, and the identifier of the receiver host system (step 308). If some of the information to be stored in the record is unavailable, the record is stored with the information that is available.

For an outgoing message (decision step 304), the messaging extension checks whether a correlator code is present in the message header (decision step 310). The first outgoing message of the first Web service component involved in a composite Web service transaction is the event that generally triggers generating a correlator code to uniquely identify the transaction (step 312). In an example embodiment, the correlator code may be a generated as a combination of the network address of the host system in combination with the current timestamp. For example, the timestamp is retrieved from the local system as the number of milliseconds that has passed since the local system clock's default origin date (e.g. since Jan. 1, 1970). This timestamp value is a large integer number, such as 1048536786109. An example network address is an Internet Protocol (IP) address of a machine. An IP address consists of four integers each between 0 and 255. For example, 15.4.90.136 is a valid IP address for a machine that is connected to the Internet.

A unique correlator is generated as follows: The IP address fields are prefixed with zeros in order to turn each IP address field into a three-digit number, for example, 015.004.090.136. Then, all four fields of the IP address are merged by removing the dots that separate the fields, for example, 015004090136. This 12-digit number is merged with the timestamp, such that the 12-digit IP address precedes the timestamp, for example, 0150040901361048536786109. This number is used as the unique correlator. For an in-process composite Web service transaction, the correlator code will be present in a message header (step 314). The messaging extension writes a record in the database to describe the outgoing message (step 316) and returns to step 302 to process another message.

Figure 4:
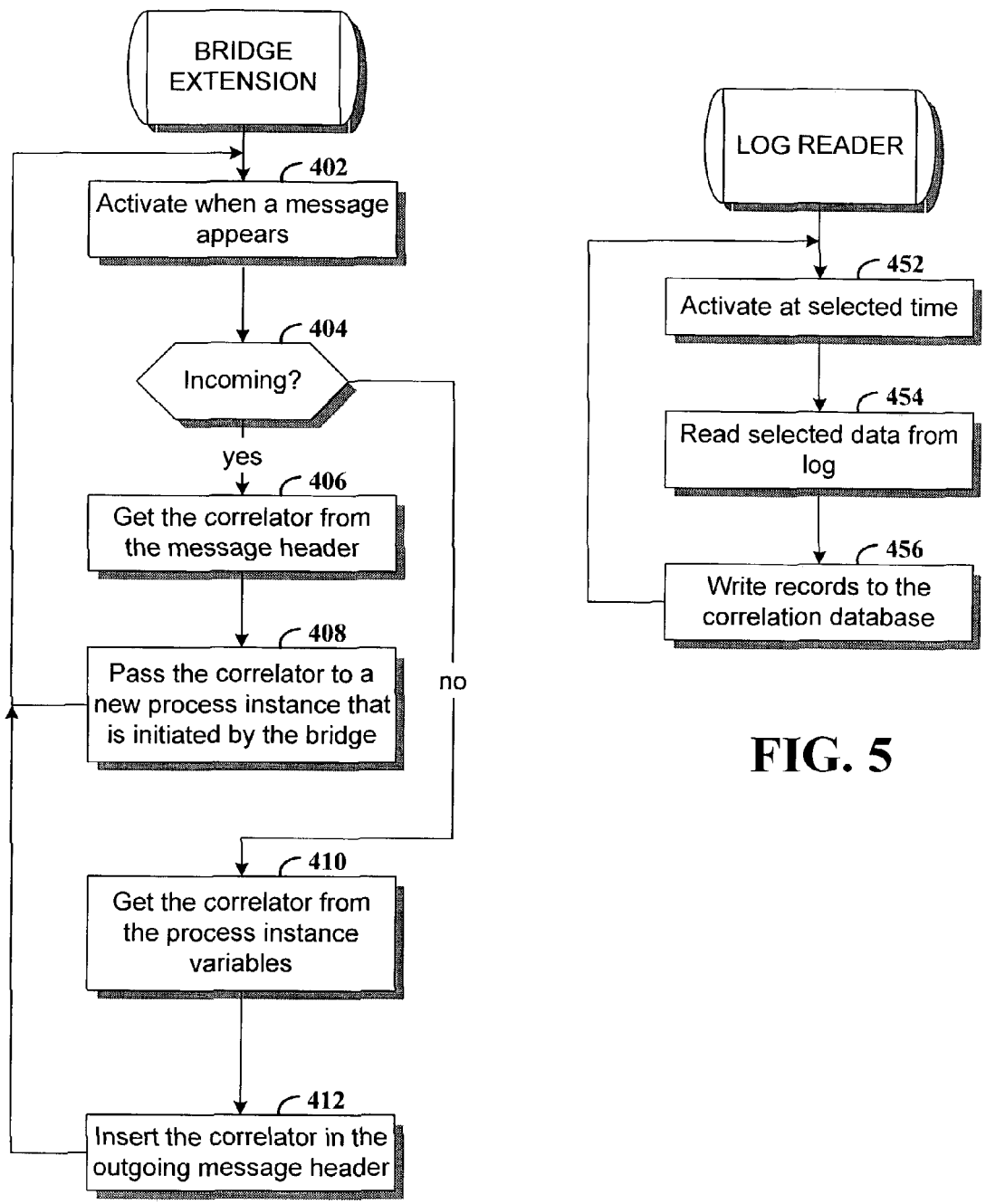
FIG. 4 is a flowchart of an example process implemented by a bridge extension.

FIG. 4 is a flowchart of an example process implemented by a bridge extension. The bridge extension ensures that correlator codes are passed between a Web service component and a process engine. The process is activated when a message appears to be processed (step 402). For an incoming message (decision step 404), the correlator code may be obtained from the message header (step 406) and passed as a parameter to a new process instance as initiated by the bridge (step 408).

For an outgoing message (decision step 404), the correlator code may be obtained from the variables used by the process instance (step 410). The correlator code is inserted in the message header of the outgoing message (step 412), and the process returns step 402 to wait to be activated when another message is available for processing.

Figure 5:
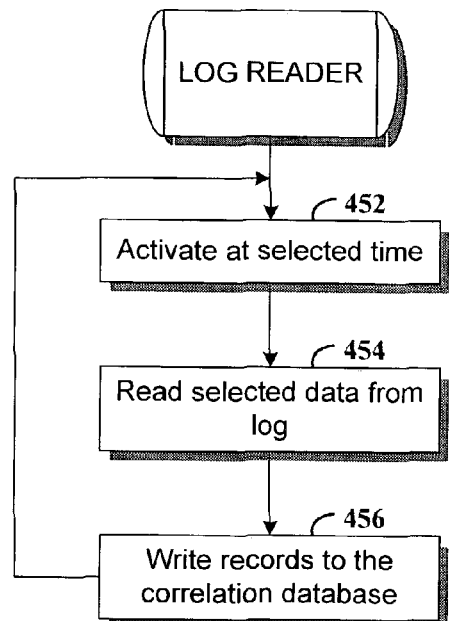
FIG. 5 is a flowchart of an example process implemented by a log reader for reading information from a process engine log and writing the information to a correlation database.

FIG. 5 is a flowchart of an example process implemented by a log reader for reading information from a process engine log and writing the information to a correlation database. In the example implementation, the log reader activates periodically (step 452). Upon activation, the log reader reads data from the process engine log file (e.g., 232 and 234, FIG. 2). The data describe actions taken by activities managed by the process engine. The data read is limited to that read since the last activation of the log reader. The log reader performs any necessary formatting of the data and writes records to the correlation database (step 456).

It will be appreciated that because the bridge extension provides the correlator codes to the process engine, the correlator codes may be stored by the process engine in the log file along with the other activity-related data. This permits the correlator codes to be carried over to the correlation database, and the data logged by the process engine can be analyzed in conjunction with the logged message interaction data.

Figure 6:
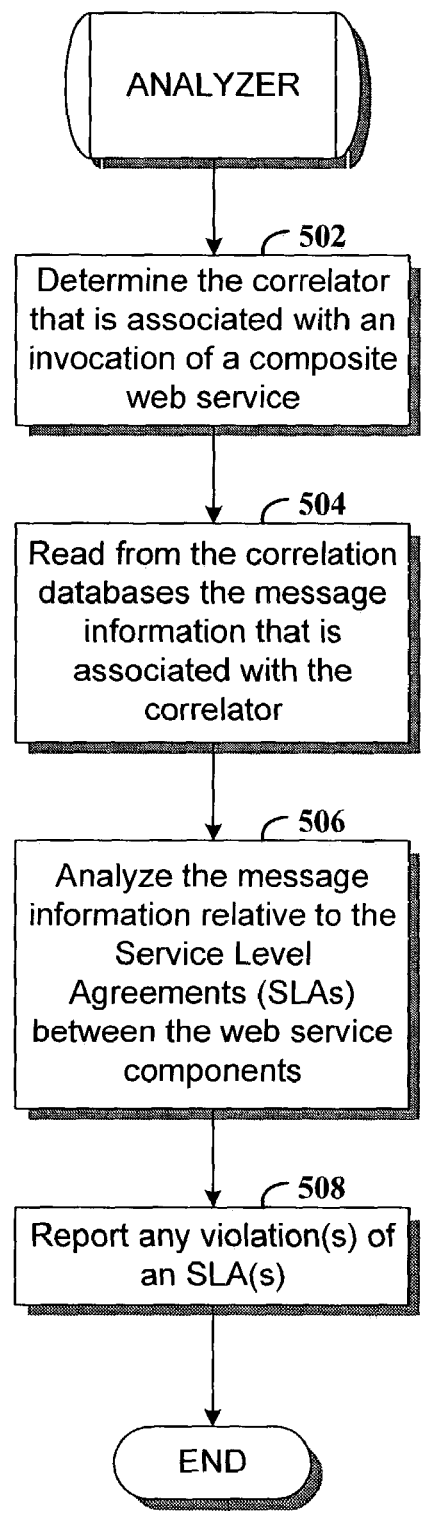
FIG. 6 is a flowchart of an example process for analyzing Web service interactions and process engine activities.

FIG. 6 is a flowchart of an example process for analyzing Web service interactions and process engine activities in accordance with various embodiments of the invention. The analysis requires a correlator code that is associated with a composite Web service transaction (step 502). For example, the various Web service component and associated back-end activities may output the correlator code to a user during the normal course of processing so that when a problem does occur, the relevant correlator code is known. Alternatively, transaction-specific information may be used to derive the correlator code from the logged data.

Once the desired correlator code is identified, the data that is associated with the correlator code is read from the correlation databases at the various enterprises (step 504). The timestamps on the logged data allows the analyzer to trace processing of the transaction from one Web service component to another from beginning to end. Using the SLAs for the requirements that the Web service components must satisfy, the message and activity data are analyzed for satisfaction of the requirements. For example, the SLAs specify what action is to be taken and when the action is to be taken. If the message or activity data indicate that a required action was not performed in the required time period, a problem may be flagged. It will be appreciated that the particular method through which the correlation data are analyzed relative to the SLAs will vary from application to application. Any violations of SLAs may be reported to a user for further analysis (step 508).

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of arrangements for implementing composite Web services and has been found to be particularly applicable and beneficial in correlating interactions between Web service components and back-end activities of the Web service components. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for tracing operations of and interactions between components that cooperatively implement a composite web service, comprising:

generating an identifier code at initiation of the composite web service;

propagating the identifier code in messages transmitted between components of the web service, wherein the components are associated with corresponding correlation databases;

logging, by a computer, the identifier code and first message-description data in the correlation database associated with a first of the components when the first component receives a first message associated with the web service from a second one of the components;

logging, by the computer, the identifier code and second message-description data in the correlation database associated with the first component when the first component sends a second message associated with the web service;

propagating the identifier code from the first component to one or more back-end processes that perform work associated with the first component;

logging in a log file the identifier code and associated activity description data by the one or more back-end processes; and updating the corresponding correlation database associated with the first component with information from the log file.

2. The method of claim 1, further comprising:

checking whether an outgoing message from a component of the web service includes the identifier code; and if the outgoing message does not include the identifier code, generating the identifier code and including the identifier code in the outgoing message.

3. The method of claim 1, wherein the identifier code is a function of a timestamp and a network address of a system that hosts the first component.

4. The method of claim 1, further comprising:

establishing at least one service level agreement between the web service components;

reading from one of the correlation databases message information that is associated with the identifier code; and determining from the message information whether the web service components adhered to the at least one service level between the components.

5. The method of claim 1, further comprising:

accessing the correlation databases to correlate interactions among the components of the composite web service, wherein correlating the interactions is based on the identifier code associated with the composite web service and that is stored in the correlation databases.

6. The method of claim 5, further comprising:

in response to a detected problem of the composite web service, determining based on information corresponding to the identifier code accessed from the correlation databases, which of the components caused the problem.

7. The method of claim 1, wherein the first message-description data describes the first message received by the first component, and the second message-description data describes the second message sent by the first component.

8. A computer-implemented method for tracing operations of and interactions between components that cooperatively implement a composite web service, comprising:
generating an identifier code at initiation of the composite web service;
propagating the identifier code in messages transmitted between components of the web service;
logging the identifier code and first message-description data in a correlation database associated with a first of the components when the first component receives a first message associated with the web service from a second one of the components;
logging the identifier code and second message-description data in the correlation database when the first component sends a second message associated with the web service,
wherein the second message-description data includes time data that indicates a time at which the second message was sent, and the first message-description data includes time data that indicates a time at which the first message was received;
propagating the identifier code from the first component to one or more back-end processes that perform work associated with the first component;
logging in a log file the identifier code and associated activity description data by the one or more back-end processes; and
updating the corresponding correlation database associated with the first component with information from the log file.

9. The method of claim 8, wherein each of the first and second message-description data includes a sender identifier and a receiver identifier that identify components of the composite web service.

10. The method of claim 9, wherein the second message-description data includes a parent-message identifier code, wherein the parent-message identifier code specifies a message identifier code of a third message in response to which the second message was sent.

11. An article of manufacture, comprising:
one or more non-transitory computer-readable media configured with instructions for causing one or more computers to trace operations of and interactions between components that cooperatively implement a composite web service by performing the steps of,
generating an identifier code at initiation of the composite web service;
propagating the identifier code in messages transmitted between components of the web service;
logging the identifier code and first message-description data in a correlation database associated with a first of the components when the first component receives a first message associated with the web service from a second one of the components;
logging the identifier code and second message-description data in the correlation database when the first component sends a second message associated with the web service;
associating respective correlation databases with the corresponding components of the web service;
logging by each component in the respective correlation database the identifier code and corresponding message-description data associated with the web service;
propagating the identifier code from the first component to one or more back-end processes that perform work associated with the first component;
logging in a log file the identifier code and associated activity description data by the one or more back-end processes; and
updating the corresponding correlation database associated with the first component with information from the log file.

12. The article of manufacture of claim 11, wherein the identifier code is a function of a timestamp and a network address of a system that hosts the first component.

13. The article of manufacture of claim 11, wherein the one or more computer-readable media are further configured with instructions for causing the one or more computers to perform the steps of:
establishing at least one service level agreement between the web service components;
reading from one of the correlation databases message information that is associated with the identifier code; and
determining from the message information whether the web service components adhered to the at least one service level agreement between the components.

14. The article of claim 11, wherein the one or more computer readable media are further configured with instructions for causing the one or more computers to perform the steps of:
accessing the correlation databases to correlate interactions among the components of the composite web service, wherein correlating the interactions is based on the identifier code associated with the composite web service and that is stored in the correlation databases.

15. The article of manufacture of claim 11, wherein the first message-description data describes the first message received by the first component, and the second message-description data describes the second message sent by the first component.

16. An article of manufacture, comprising:
one or more non-transitory computer-readable media configured with instructions for causing one or more computers to trace operations of and interactions between components that cooperatively implement a composite web service by performing the steps of:
generating an identifier code at initiation of the composite web service;
propagating the identifier code in messages transmitted between components of the web service;
logging the identifier code and first message-description data in a correlation database associated with a first of the components when the first component receives a first message associated with the web service from a second one of the components;
logging the identifier code and second message-description data in the correlation database when the first component sends a second message associated with the web service,
wherein the second message-description data includes time data that indicates a time at which the second message was sent, and the first message-description data includes time data that indicates a time at which the first message was received;
propagating the identifier code from the first component to one or more back-end processes that perform work associated with the first component;

logging in a log file the identifier code and associated activity description data by the one or more back-end processes; and updating the corresponding correlation database associated with the first component with information from the log file.

17. The article of manufacture of claim 16, wherein each of the first and second message description data includes a sender identifier and a receiver identifier that identify components of the composite web service.

18. The article of manufacture of claim 17, wherein the second message-description data includes a parent-message identifier code, wherein the parent-message identifier code specifies a message identifier code of a third message in response to which the second message was sent.

19. The article of manufacture of claim 16, wherein the first message-description data describes the first message received by the first component, and the second message-description data describes the second message sent by the first component.

20. The article of manufacture of claim 16, wherein the first message-description data describes the first message received by the first component, and the second message-description data describes the second message sent by the first component.

21. A web service computing arrangement, comprising:

a plurality of web service components executable on one or more computers that cooperatively implement a composite web service;

correlation databases associated with respective web service components;

a plurality of messaging extensions respectively coupled to the web service components, each messaging extension configured to generate an identifier code at initiation of the composite web service, propagate the identifier code in messages transmitted between the web service components, log the identifier code and first message-description data in a corresponding one of the correlation databases associated with a first one of the web service components when the first web service component receives a first message associated with the composite web service from a second one of the web service components, and log the identifier code and second message-description data in the correlation database associated with the first web service component when the first web service component sends a second message associated with the composite web service;

an analyzer to access the correlation databases to correlate interactions among the web service components, wherein the correlating is based on the identifier code;

a plurality of process engines, wherein each of the web service components is coupled to at least one of the process engines, and each process engine is configured to manage application-specific tasks associated with a coupled web service component, and log in a log file the identifier code and associated task description data associated with tasks managed by the process engine;

a log reader coupled to the log file and to the corresponding correlation database, the log reader configured to update the correlation database with information from the log file.

22. The computing arrangement of claim 21, wherein the analyzer is to further, in response to a detected problem of the composite web service, determine based on information corresponding to the identifier code accessed from the correlation databases, which of the components caused the problem.

23. The computing arrangement of claim 21, wherein the identifier code is a function of a time at which the first or second message is processed by the first web service component and a network address used in addressing the first web service component.

24. The computing arrangement of claim 21, further comprising:

a plurality of stored service level agreements, each service level agreement specifying requirements of interactions between a corresponding pair of web service components;

an analyzer coupled to the correlation databases and to the stored service level agreements, the analyzer configured to read from one of the correlation databases message information that is associated with a selected identifier code and determine from the message information whether the web service components adhered to service level agreements between the components.

25. The computing arrangement of claim 21, wherein the first message-description data describes the first message received by the first web service component, and the second message-description data describes the second message sent by the first web service component.

* * * * *

UNITED STATES PATENT AND TRADEMARK OFFICE
CERTIFICATE OF CORRECTION

| | | |
|---|---|---|
| PATENT NO. | : 7,912,938 B2 | Page 1 of 1 |
| APPLICATION NO. | : 10/412497 | |
| DATED | : March 22, 2011 | |
| INVENTOR(S) | : Sayal et al. | |

It is certified that error appears in the above-identified patent and that said Letters Patent is hereby corrected as shown below:

In column 12, lines 28-29, in Claim 14, delete "computer readable" and insert
-- computer-readable --, therefor.

In column 14, lines 33-34, in Claim 24, delete "an analyzer coupled to the correlation
databases and to the stored service level agreements, the analyzer configured" and
insert -- wherein the analyzer is configured --, therefor.

Signed and Sealed this
Twenty-eighth Day of June, 2011

David J. Kappos
*Director of the United States Patent and Trademark Office*